United States Patent [19]

Carballo

[11] Patent Number: 5,039,973
[45] Date of Patent: Aug. 13, 1991

[54] ELECTRONIC FOOT PEDAL CONTROLLER WITH BOOSTER POWER FOR UNIVERSAL MOTORS

[76] Inventor: Rodolfo A. Carballo, 4648 North Avenida De Cazador, Tucson, Ariz. 85718

[21] Appl. No.: 475,315
[22] Filed: Feb. 5, 1990
[51] Int. Cl.⁵ .......................................... H01C 10/10
[52] U.S. Cl. ................................... 338/153; 338/108
[58] Field of Search ........................ 338/153, 108, 78

[56] References Cited

U.S. PATENT DOCUMENTS

| | | | |
|---|---|---|---|
| 3,596,102 | 7/1971 | Brooks | 338/78 X |
| 4,322,711 | 3/1982 | Spangler et al. | 338/153 |
| 4,397,251 | 8/1983 | Leutwyler | 338/108 X |

Primary Examiner—Marvin M. Lateef
Attorney, Agent, or Firm—Victor Flores

[57] ABSTRACT

A variable power foot pedal controller for controlling electrical power to universal motors and which contains solid state circuitry that boosts the power to accommodate high torque performance from the motor in response to load changes. The foot pedal controller includes a steel cable linkage arrangement that interfaces with a slide type control variable resistor that provides the linear motion control for varying the resistance that biases the solid state circuitry that boosts the power being delivered to the motor. The linkage arrangement allows operator incremental power delivery control by manipulating the slide variable resistor and further activates and deactives switch elements according to positional states of the linkage to energize the solid state circuitry or bypass the solid state circuitry.

17 Claims, 2 Drawing Sheets

ELECTRONIC FOOT PEDAL CONTROLLER WITH BOOSTER POWER FOR UNIVERSAL MOTORS

RELATED PATENT APPLICATION

This application is related to patent application entitled: "HIGH TORQUE-HIGH SPEED UNIVERSAL POWER CONTROL CONSOLE WITH ATTACHED FOOT PEDAL CONTROLLER" being filed concurrently with and on even date as this patent application by the same applicant.

FIELD OF THE INVENTION

This invention relates to operator controlled variable ac power delivery apparatus and methods. More particularly, the present invention relates to variable speed motor control apparatus and methods used to supply power to universal motors that are subjected to fluctuating loads that impact the speed performance of the motor. Even more particularly, the present invention relates to variable motor control apparatus packaged in an enclosure having a foot pedal actuating means to control delivery of power to universal motors and which have circuit means responsive to load changes to boost the power being delivered to the motor to minimize the operational perfomance impact on the universal motors.

DESCRIPTION OF THE PRIOR ART

There are certain tasks performed by crafts persons that require precision speed control of the operation of the hand tool being used. Typically, the tools used by craftpersons involves electrically powered hand tools, such as hand drills, sanders, jigsaws, buffers, polishers, or other electrically powered hand tools such as those used in jewelry crafts, namely flexible shaft motors, wax guns, and others small power tools employing universal (brush type) motors. Ac power receptacles, having several ac outlets are commonly employed when utilizing the aforementioned power hand tools to interface to the main building power source. These power receptacles are merely an extension of the wall outlet and often include an on/off switch and noise filtering means to block electrical noise. Other devices often employed in interfacing with these power hand tools are variac devices that can be controlled to deliver a predetermined percentage of line voltage to the power hand tool. These variac devices tend to be expensive and do not compensate for load changes often seen by the electrically coupled power hand tool and therefore degrading the motor performance.

A commonly employed motor control circuit typically includes a full wave triac and diac bilateral trigger (bidirectional semiconductor) devices, a charging capacitor and potentiometer that is used to control the charging voltage on the capacitor that biases the diac and the firing of the triac that couples the full wave of the line voltage to a motor. The speed of the motor is controlled by adjusting the potentiometer throughout its ohmic range thus defining the time constant of firing. With this type of motor control circuit, the current delivered to the motor is limited by the triac element via the charge voltage maintained on the capacitor that triggers the diac. If there is an applied load change, speed and torque of the motor are drastically affected due to the inability of the motor control circuit to respond to the applied load.

The sensitivity and responsiveness of the potentiometer employed in the motor control circuit can greatly affect the motor control. In some applications, a foot pedal having an integral potentiometer is employed in combination with the above described motor control circuit. An example of this type of pedal controller is taught by U.S. Pat. No. 4,322,711, wherein a rotary potentiometer accommodates a helical member to produce the variable resistance that generates the charging voltage at the capacitor in the motor control circuit. Although, the foot pedal controller taught in the '711 patent is intended to provide a smooth, accurate and a wide range controllable change in motor speeds, certain craft tasks demand even greater control over the motor's speed and torque. Further, it is desirable to have a foot pedal controller that also contains the electronic control means integrated with the foot pedal actuating means for compactness and ease of use beneath a work bench.

Therefore, a need is seen to exist for a motor control apparatus that not only includes slide control variable resistor in a foot pedal power controller, but that also incorporates a normal operating, high speed motor control network and a power booster solid state network that compensates for applied load changes seen by the coupled universal motor that operates at high torque without impacting speed and retaining a constant speed independently of the applied load variations.

SUMMARY OF THE INVENTION

Accordingly, the primary object of the present invention is to provide a variable motor control apparatus packaged in an enclosure having a foot pedal actuating means to control delivery of power to universal motors and which have circuit means responsive to load changes to boost the power being delivered to the motor.

A related object of the present invention is to provide a foot pedal controller apparatus having a mechanical cable linkage that interfaces with a slide type control variable resistor that provides the linear motion control for varying the resistance that biases the circuit means that boosts the power being delivered to the motor.

Another object of the present invention is to provide a method of controlling the speed and torque of universal electric motors using the apparatus of the present invention.

Therefore, to the accomplishments of the foregoing objects, the invention consists of the foregoing features hereinafter fully described and particularly pointed out in the claims, the accompanying drawings and the following disclosure describing in detail the invention, such drawings and disclosure illustrating but one of the various ways in which the invention may be practiced.

DESCRIPTION OF THE PREFERRED EMBODIMENT

Figure 1:
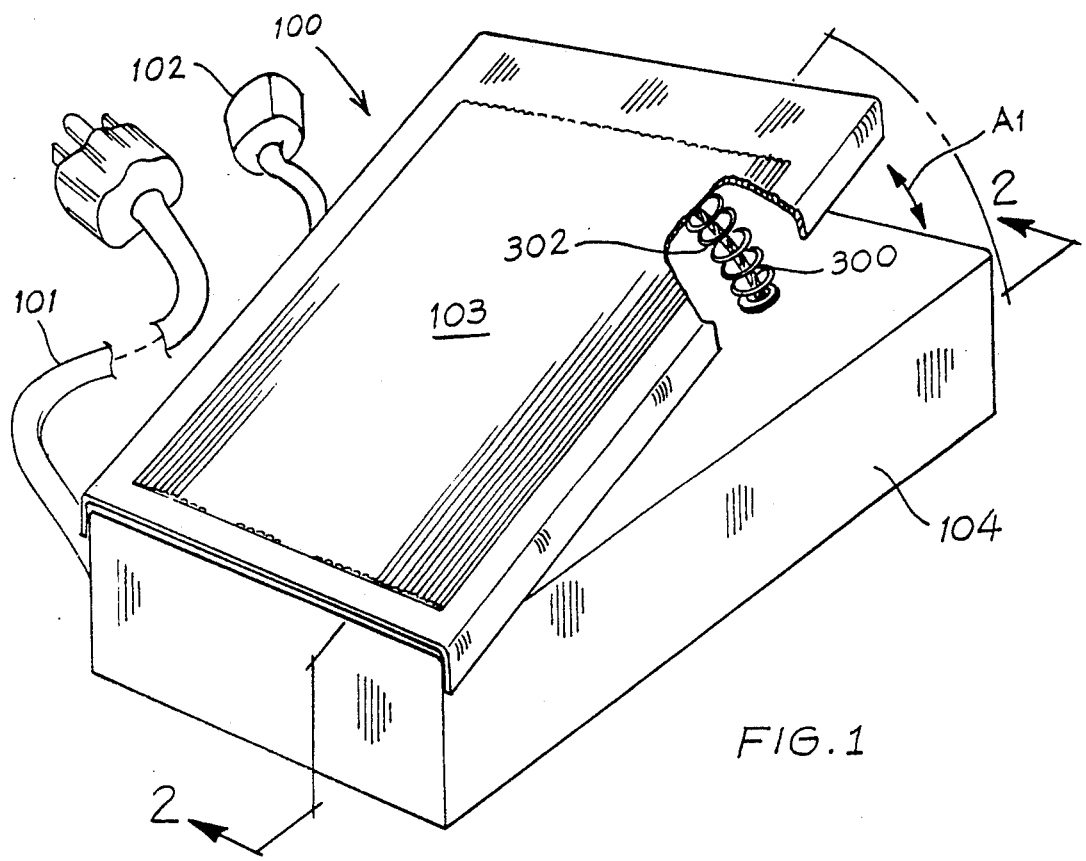
FIG. 1 is a perspective view of the present invention illustrating a foot pedal controller having integrated solid state circuitry for controlling variable output voltages to electrical appliances in accordance with the objectives of the present invention.

Referring now to FIG. 1 where foot pedal controller 100 is shown comprising a base floor member 104, a hinged foot pedal member 103, a compressably attached spring 302 encircling a steel cable member 300. Base floor member 104 interfaces with input electrical power cord 101 and power output receptacle cord 102.

Figure 2:
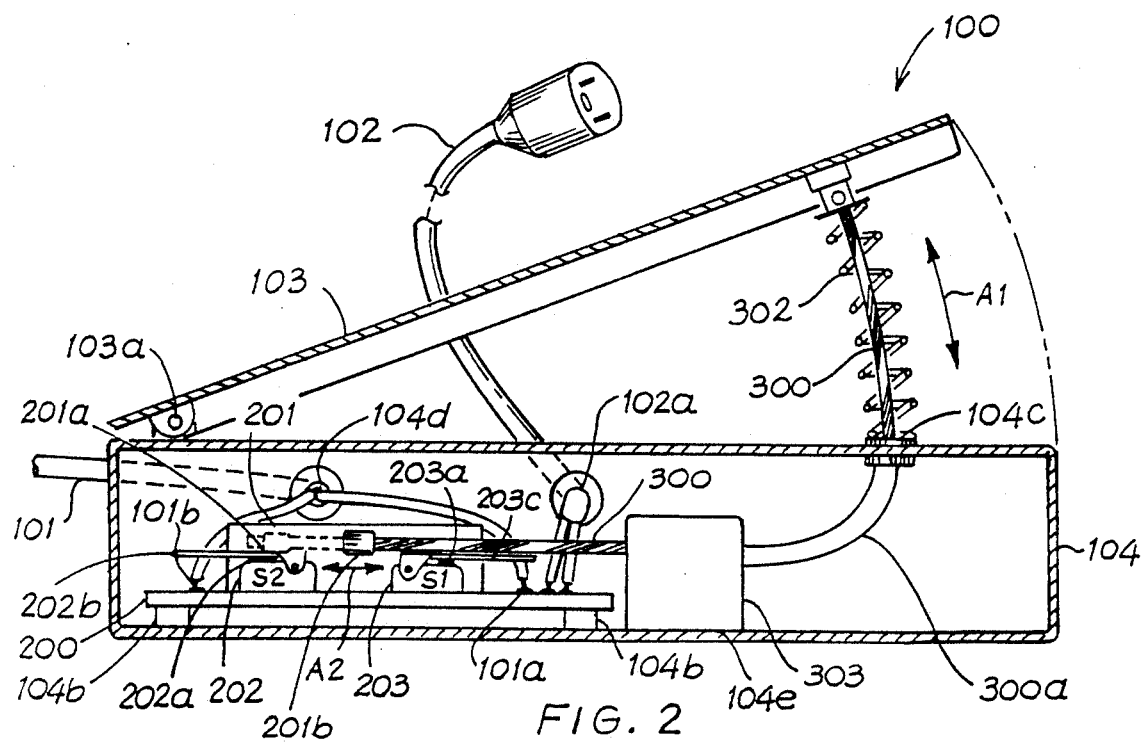
FIG. 2 is a sectional view taken along the line 2—2 in FIG. 1 illustrating the cable linkage used to impart motion on the slide member of the slide control variable resistor and includes illustrating switches S1 and S2 in an actuatable relationship with the variable resistor's slide member.

FIG. 2 shows a cross-sectional view of foot pedal controller 100 where, input cord 101 having leads 101a and 101b, enter base member 104 at 104d and that electrically interfaces onto printed wiring board 200. Printed wiring board 200 is attached to a bottom portion of base member 104 and is isolated therefrom by standoffs 104b. A slide control variable resistor 210 (component R2, see FIGS. 3) is mounted onto printed wiring board 200. To achieve enhanced operator foot pedal control the mechanical arrangement including a flexible steel cable 300 is provided. The entire mechanical linkage comprises foot pedal member 103 having an upper end portion of spring member 300 attached thereto and to the top portion of base member 104. Encircled within spring member 302 is steel cable 300 that enters enclosure 104 at 104c and into guide sheathing 300a and stop guide block 303 anchored at 104e and out of stop guide block 303 to connect with electrically isolated linear motion slide control tab 201b. In operation, pedal 103 is depressed by an operator, as shown by arrow A1 and enabled by hinge means 103a, which action urges cable 300 through guides 300a and block 303 and resultant movement of tab 201b within slide 201a as indicated by arrow A2. Switch 203 (element S1, see FIG. 3) is in an actuatable relationship with tab 201b due to the mechanical arrangement of flexible strip 203c that contacts tab 201b to depress S1's button 203a that controls the ON/OFF state of the switch. When the pedal is at rest button 203b is pressed in and the switch is in an open state. Upon urging cable 300 forwardly, S1 closes to begin energizing the circuit and will continue to do so throughout the ohmic range of variable slide resistor 201, typically 0–1K ohms. As the pedal continues being depressed, tab 201b will (or can at an desired time) be in contact with flexible strip 202b which ultimately will cause switch 202 (element S2, see FIG. 3) to close by depressing button 202a. FIG. 2 also shows output power cord 102 exiting enclosure 104 at exit port 102a. The electronic effects of the foregoing operator mechanical manipulation of pedal 103 will be discussed below.

Figure 3:
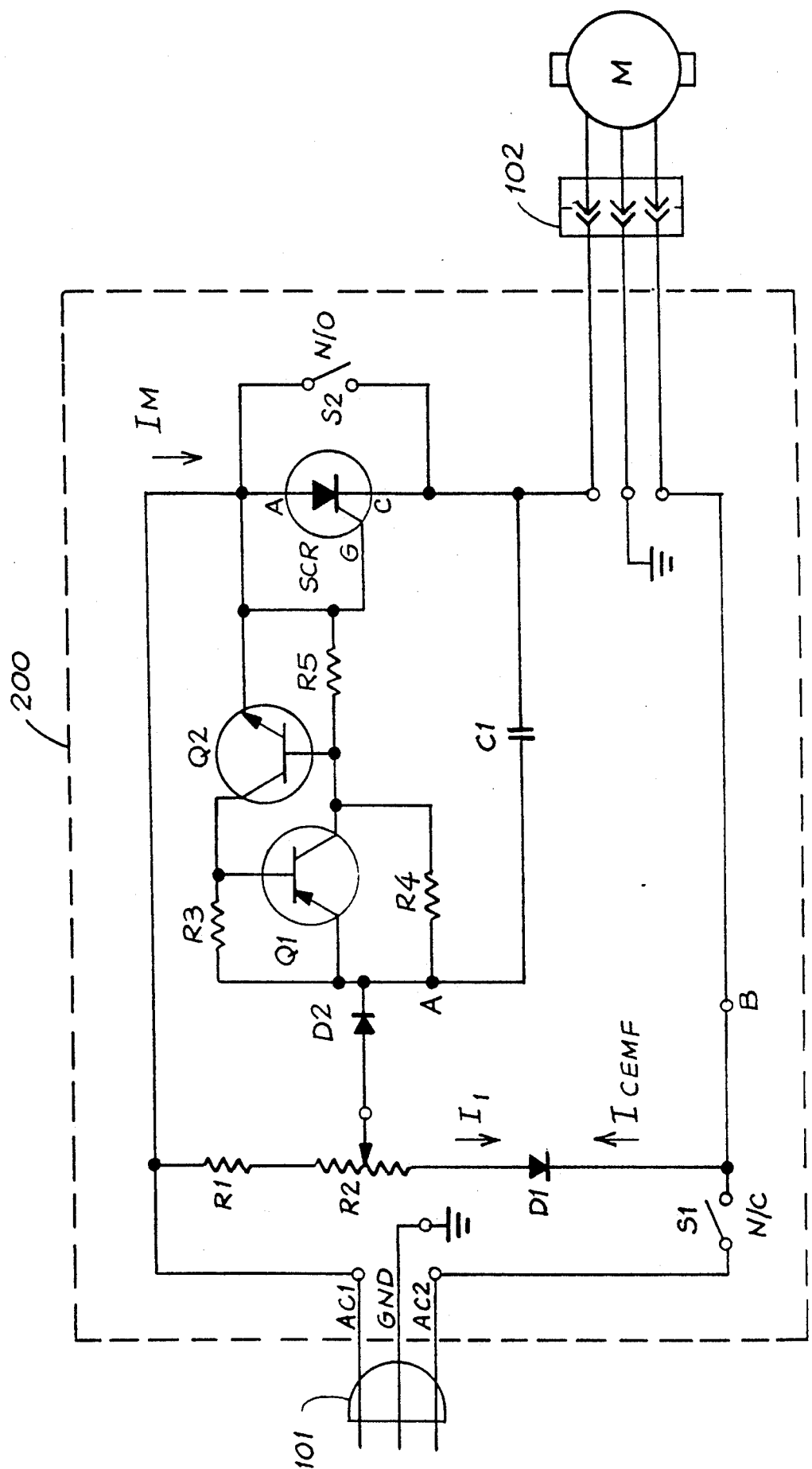
FIG. 3 is a detailed circuit schematic of the foot pedal controller having a solid state booster network integrated with a slide control variable resistor in the foot pedal controller's enclosure.

Referring now to FIG. 3 and assuming that the task at hand requires high torque from motor M, the operator will activate booster circuit 200 by depressing pedal 103 to urge cable 300 and tab 201b away from maximum resistance. The urging of tab 201b incrementally starts the storage of a voltage on C1 (typically 0.47 microfarads for 120 vac, 60 Hertz operation) that is proportional to the ratio between the sliding variable resistor R1 and R2 (5.6K and 1K ohms, respectively). The voltage divider network is however controlled by the cathode of the SCR every half cycle of ac line voltage applied via line coord 101. The firing of the SCR's gate G occurs when the charge on capacitor C1 exceeds 5 volts to cause current Im to flow anode A to cathode C through the SCR, through cable 102 to motor M. The firing of Gate G follows when the voltage at points A and B is higher than the 5 volts which causes Q1 and Q2 to become a low impedance network and allowing C1 to discharge via the SCR's gate G. The gate trigger voltage is also determined by the resistor ratio of R4 and R5 (typically 1K ohms each) and Q1's base emiter resistor R3 (typically 470 ohms).

The regulation for torque is accomplished by taking advantage of counter electromotive force current (Icemf) generated by motor M during operation) and which current is 180 degrees out of phase with current I1 and which produces a differential voltage across D1, hence D2 increase its differential voltage to prolong the discharge of C1 while Q1 and Q2 network are in a low impedance state causing the SCR to be harder forward biased by voltage amounts proportional to the increased current Im demanded by motor M.

If the task at hand is merely a high speed requirement, then an operator merely depresses foot pedal 103 to the extreme lowest position to activate switch S2 to a closed position. With S2 closed the SCR is by passed and the full wave line voltage is available to motor M.

Although input voltages are not specifically enumerated, suffice it to state that component values can selected to accommodate worldwide ac voltage at respective 50 or 60 hertz, or appropriate dc voltage inputs.

Therefore, while the present invention has been shown and described herein in what is believed to be the most practical and preferred embodiments, it is recognized that departures can be made therefore within the scope of the invention, which is therefore not to be limited to the details disclosed therein but is to be accorded the full scope of the claims so as to embrace any and all equivalent apparatus.

I claim:

1. An electrical power control apparatus, said apparatus comprising:

foot pedal controller means for controlling energizing an electrically coupled electrical appliance, said foot pedal controller means comprising a first circuit means for responding to a first loading condition on said appliance, a second circuit means for responding to a second loading condition on said electrical appliance, and a foot pedal linkage means for actuating said first circuit means responsive to said first loading condition and for further actuating said second circuit means responsive to said second loading condition.

2. An electrical power control apparatus as recited in claim 1, wherein, said foot pedal linkage means comprises:

flexible steel cable means for controllably urging a slide tab member of a variable resistor from a shut-off electrical state throughout an ohmic range of operation of said variable resistor;

a first guide means for directing said flexible steel cable towards said slide tab member;

a second guide means for further directing said flexible steel cable towards said slide tab member; and spring means for de-compressably returning said slide tab to said shut-off electrical state by acting on said flexible steel cable.

3. An electrical power control apparatus as recited in claim 1, wherein, said first circuit means comprises:

slide linear motion variable resistor means coupled to said foot pedal linkage means for controllably generating a charging voltage on a capacitor;

half wave rectifier circuit means coupled to said variable resistor means for effecting said generating a charging voltage on said capacitor, a first diode member of said rectifier circuit means being responsive to a counter electromotive force current being generated by a motor member of said electrical appliance; and dual impedance-state transistor network means responsive to said charging voltage for energizing a silicon controlled rectifier (SCR) device that enables providing power to said electrical appliance, said first diode member producing a voltage differential that increases a turn-on period for said transistor network and said SCR device.

4. An electrical power control apparatus as recited in claim 3, wherein, said slide linear motion variable resistor means is in a mechanical contact relationship with a first switch member of said first circuit means to control an on-off power state of said apparatus.

5. An electrical power control apparatus as recited in claim 3, wherein, said foot pedal linkage means comprises:

flexible steel cable means for controllably urging a slide tab member of said slide linear motion variable resistor means from a shut-off electrical state throughout an ohmic range of operation;

a first guide means for directing said flexible steel cable towards said slide tab member;

a second guide means for further directing said flexible steel cable towards said slide tab member; and spring means for de-compressably returning said slide tab to said shut-off electrical state by acting on said flexible steel cable.

6. An electrical power control apparatus as recited in claim 5, wherein, said slide linear motion variable resistor means is in a mechanical contact relationship with a first switch member of said first circuit means to control an on-off power state of said apparatus.

7. An electrical power control apparatus as recited in claim 3, wherein, said second circuit means comprises:

mechanical switch means for electrically bypassing said first circuit means, said mechanical switch means being in a mechanical contact relationship with said foot pedal linkage means.

8. An electrical power control apparatus as recited in claim 1, wherein, said second circuit means comprises:

mechanical switch means for electrically bypassing said first circuit means, said mechanical switch means being in a mechanical contact relationship with said foot pedal linkage means.

9. An electrical power control apparatus as recited in claim 4, wherein, said second circuit means comprises:

mechanical switch means for electrically bypassing said first circuit means, said mechanical switch means being in a mechanical contact relationship with said foot pedal linkage means.

10. An electrical power control apparatus, said apparatus comprising:

foot pedal controller means for controlling energizing an electrically coupled electrical appliance, said foot pedal controller means comprising a first circuit means for responding to a first loading condition on said appliance, a second circuit means for responding to a second loading condition on said electrical appliance, and a foot pedal linkage means for actuating said first circuit means responsive to said first loading condition and for further actuating second circuit means responsive to said second loading condition, said foot pedal linkage means comprising:

flexible steel cable means for controllably urging a slide tab member of a variable resistor from a shut-off electrical state throughout an ohmic range of operation of said variable resistor, a first guide means for directing said flexible steel cable towards said slide tab member, a second guide means for further directing said flexible steel cable towards said slide tab member, and spring means for de-compressably returning said slide tab to said shut-off electrical state by acting on said flexible steel cable.

11. An electrical power control apparatus as recited in claim 10, wherein, said first circuit means comprises:

slide linear motion variable resistor means coupled to said foot pedal linkage means for controllably generating a charging voltage on a capacitor;

half wave rectifier circuit means coupled to said variable resistor means for effecting said generating a charging voltage on said capacitor, a first diode member of said rectifier circuit means being responsive to a counter electromotive force current being generated by a motor member of said electrical appliance; and dual impedance-state transistor network means responsive to said charging voltage for energizing a silicon controlled rectifier (SCR) device that enables providing power to said electrical appliance, said first diode member producing a voltage differential that increases a turn-on period for said transistor network and said SCR device.

12. An electrical power control apparatus as recited in claim 11, wherein, said slide linear motion variable resistor means is in a mechanical contact relationship with a first switch member of said first circuit means to control an on-off power state of said apparatus.

13. An electrical power control apparatus as recited in claim 12, wherein, said second circuit means comprises:

mechanical switch means for electrically bypassing said first circuit means, said mechanical switch means being in a mechanical contact relationship with said foot pedal linkage means.

14. A method of controlling delivery of electrical power to an electrical appliance, said method comprising the steps of:

(a) providing a foot pedal controller apparatus, said apparatus comprising:

foot pedal controller means for controlling energizing an electrically coupled electrical appliance, said foot pedal controller means comprising a first circuit means for responding to a first loading condition on said appliance, a second circuit means for responding to a second loading condition on said electrical appliance, and a foot pedal linkage means for actuating said first circuit means responsive to said first loading condition and for further actuating second circuit means responsive to said second loading condition;

(b) actuating said foot pedal linkage means to a first linkage position and energizing said first circuit means to enable high torque performance from said electrical appliance; and (c) actuating said foot pedal linkage means to a second linkage position and bypassing said first circuit means and actuating said second circuit means.

15. A method of controlling delivery of electrical power to an electrical appliance, as recited in claim 14 wherein:
    said step (b) includes actuating a flexible cable member of said foot pedal linkage means for urging a slide member of a slide variable resistor to come into mechanical contact with a switch element of said first circuit means that changes an electrical state of said apparatus from off to on.

16. A method of controlling delivery of electrical power to an electrical appliance, as recited in claim 14 wherein:
    said step (c) includes actuating a flexible cable member of said foot pedal linkage means for urging a slide member of a slide variable resistor to come into mechanical contact with a switch element of said second circuit means that bypasses said first circuit means.

17. A method of controlling delivery of electrical power to an electrical appliance, as recited in claim 15 wherein:
    said energizing of said circuit means includes utilizing a counter electromotive force current generated by a motor member of said electrical appliance and prolonging a turn-on period for supplying power to said electrical appliance.

* * * * *